United States Patent Office 3,748,318
Patented July 24, 1973

3,748,318
ALKYLATION OF POLYSTYRENE
Jerome Robert Olechowski, Trenton, N.J., assignor to Cities Service Company, New York, N.Y.
No Drawing. Filed Sept. 3, 1971, Ser. No. 177,882
Int. Cl. C08f 7/04, 27/00
U.S. Cl. 260—93.5 A
10 Claims

ABSTRACT OF THE DISCLOSURE

A styrene polymer, such as a molding grade polystyrene, is alkylated with an alkene while in contact with a catalyst composition comprising a transition metal salt, an organometallic compound of a Group I–A, II–A, II–B, or III–A metal, and a proton donor. In accordance with preferred embodiments of the invention, the alkene is a normally gaseous alkene, and the catalyst composition consists essentially of a halide of tungsten, molybdenum, or rhenium, an alkyl aluminum halide, and a lower alkanol.

BACKGROUND OF THE INVENTION

Field of the invention

This invention relates to the alkylation of styrene polymers and more particularly relates to such an alkylation in the presence of a coordination catalyst system.

Description of the prior art

As taught in U.S. Pats. 2,614,080 and 2,651,628, polystyrene may be alkylated with an alkyl halide or an alkene in the presence of a Friedel-Crafts catalyst. However, these alkylation processes often have the disadvantage of degrading the polymer and thus leading to the formation of alkylated polymers having too low a molecular weight for molding purposes. This disadvantage can be avoided when the alkyl groups are introduced into the polymer by the polymerization of an alkylstyrene monomer, but this technique involves the uneconomical procedure of preparing, purifying, and then polymerizing the alkylstyrene monomer.

SUMMARY OF THE INVENTION

An object of this invention is to provide a novel process for alkylating styrene polymers.

Another object is to provide such a process which is suitable for the preparation of molding grade polymers.

These and other objects are attained by contacting a styrene polymer with an alkene and a catalyst composition comprising a transition metal salt, an organometallic compound of a Group I–A, II–A, II–B, or III–A metal, and a proton donor selected from glycols and compounds corresponding to the formula ROH wherein R is alkyl, aryl, alkaryl, or aralkyl and wherein any alkyl group contains up to 5 carbon atoms and any aryl group is phenyl or naphthyl.

DESCRIPTION OF THE PREFERRED EMBODIMENTS

The styrene polymer which is alkylated in accordance with the present invention is preferably polystyrene but may be an interpolymer of styrene with up to 50% by weight of one or more copolymerizable ethylenically-unsaturated monomers. Suitable comonomers include, for example, alpha-methylstyrene; unsaturated nitriles such as acrylonitrile, methacrylonitrile, alpha-methylene glutaronitrile, etc.; alkyl (meth)acrylates such as methyl acrylate, ethyl acrylate, butyl acrylate, 2-ethylhexyl acrylate, the corresponding alkyl methacrylates, etc.; (meth)-acrylamides such as acrylamide, methacrylamide, N-t-butyl acrylamide, etc. According to a preferred embodiment of the invention, the styrene polymer is a molding grade polymer, i.e., a polymer having a Staudinger average molecular weight of about 40,000–100,000.

The transition metal salt employed as a component of the catalyst system may be one or more salts of a transition metal such as lanthanum, titanium, zirconium, hafnium, vanadium, niobium, tantalum, chromium, molybdenum, tungsten, manganese, rhenium, ruthenium, osmium, rhodium, iridium, or palladium. Preferably the salt is a halide, more preferably a chloride, but other salts such as the oxyhalides, sulfates, nitrates, phosphates, acetates, propionates, benzoates, acetylacetonates, etc., are also utilizable.

Exemplary of such salts are lanthanum trichloride, titanium tetrachloride, titanium trichloride, zirconium trichloride, hafnium tetrachloride, vanadium oxytrichloride, niobium pentabromide, tantalum pentaiodide, chromic chloride, molybdenum pentachloride, molybdenum pentafluoride, molybdenum hexabromide, molybdenum dichloride, molybdenum oxytetrachloride, molybdenum nitrate, molybdenum acetate, molybdenum propionate, molybdenum benzoate, molybdenum acetylacetonate, molybdenum sulfate, molybdenum phosphate, tungsten hexachloride, tungsten dichloride, tungsten pentabromide, tungsten hexafluoride, tungsten oxytetrachloride, tungsten sulfate, manganese trichloride, rhenium heptachloride, rhenium hexachloride, rhenium hexafluoride, rhenium pentachloride, ruthenium sesquichloride, osmium tetrachloride, rhodium sesquichloride, iridic chloride, palladous iodide, etc.

The preferred salts are the halides of tungsten, molybdenum, and rhenium, especially tungsten hexachloride, molybdenum pentachloride, and rhenium pentachloride. Ordinarily the transition metal salt is employed in an amount such as to provide about 0.0002–0.01, preferably about 0.001–0.005, mol of transition metal per mol of styrene unit in the polymer being alkylated.

The organometallic component of the catalyst system may be one or more organometallic compounds of metals of Groups I–A, II–A, II–B, and III–A of the Periodic Table of the Elements. [The Periodic Table to which reference is made is Deming's Periodic Table, which may be found in Lange, "Handbook of Chemistry," ninth edition, McGraw-Hill Book Company, Inc. (New York-Toronto-London), 1956, pages 56–57.] When the metal of the organometallic compound is multivalent, any valence not satisfied by an organic group may be satisfied by hydrogen, chlorine, bromine, iodine, or fluorine. The organic groups in these compounds are preferably alkyl groups containing 1–10 carbon atoms or aryl groups such as phenyl, tolyl, or naphthyl.

Exemplary of the organometallic compounds are methyl lithium, butyl lithiums, phenyl lithium, naphthyl lithiums, ethyl sodium, propyl potassiums, butyl rubidiums, pentyl cesiums, octyl beryllium chlorides, dimethyl magnesium, methyl magnesium bromide, diethyl calcium, ethyl calcium iodide, dipentyl strontiums, naphthyl strontium fluorides, dipropyl bariums, phenyl barium chloride, dihexyl zincs, ethyl zinc chloride, dioctyl cadmiums, butyl cadmium chlorides, trimethyl borine, phenyl boron dibromide, pentyl gallium bromides, hexyl indium chlorides, heptyl thallium chlorides, trimethyl aluminum, triethyl aluminum, tripropyl aluminums, tributyl aluminums, tripentyl aluminums, trihexyl aluminums, triheptyl aluminums, trioctyl aluminums, trinonyl aluminums, tridecyl aluminums, triphenyl aluminums, trinaphthyl aluminums, tritolyl aluminums, trimethylnaphthyl aluminums, the corresponding hydrocarbyl aluminum chlorides, dichlorides, bromides, dibromides, iodides, diiodides, fluorides, and difluorides, etc.

Preferably the organometallic compound is an aluminum compound, more preferably an alkyl aluminum halide, most preferably ethyl aluminum dichloride. The organometallic compound is usually employed in an amount such as to provide an organometallic compound/transition metal salt mol ratio of about 0.5–15, preferably about 0.75–5, most preferably about four.

The proton donor may be one or more compounds selected from glycols and compounds corresponding to the formula ROH wherein R is alkyl, aryl, alkaryl, or aralkyl and wherein any alkyl group contains up to five carbon atoms and any aryl group is phenyl or naphthyl. Exemplary of such compounds are ethylene glycol, propylene glycol, butylene glycol, pentylene glycol, methanol, ethanol, propanol, isopropanol, butanol-1, butanol-2, t-butanol, the pentanols, phenol, alpha- and beta-naphthols, cresols, xylenols, benzyl alcohol, etc. Preferably the proton donor is an alkanol containing 1–5 carbon atoms, especially ethanol. The proton donor is usually employed in an amount such as to provide a proton donor/transition metal salt mol ratio of about 1–6, preferably about 1–3, most preferably about one.

The alkene may be one or more gaseous alkenes such as ethylene, propylene, butene-1, butene-2, isobutylene, pentene-1, pentene-2, hexene-1, hexene-2, 2,3-dimethylbutene-1 heptene-1, heptene-2, octene-1, octene-2, 3-methylheptene-2, nonene-1, nonene-2, decene-1, decene-2, etc. The normally gaseous alkenes, i.e., those containing 2–4 carbon atoms, are preferred. The amount of alkene employed is not critical and varies with the products desired. Ordinarily, the amount of alkene does not exceed about 3 mols per mol of styrene unit in the polymer.

The manner in which the styrene polymer is contacted with the alkene and the catalyst composition is not critical. The alkene may be added before or after the catalyst, and it is frequently desirable to meter the alkene into the reaction vessel, e.g., by maintaining a substantially constant alkene pressure. If desired, the catalyst components may be mixed together and allowed to react with one another before being added to the reaction mixture. However, it is usually preferable to form the catalyst in situ by adding the catalyst components separately to the reaction mixture containing the polymer to be alkylated. A particularly desirable method is to mix the proton donor with a solution of the transition metal salt in an aromatic hydrocarbon solvent such as benzene, toluene, xylene, etc., add the resultant solution to the polymer, and then add the organometallic compound.

The reaction temperature is preferably maintained in the range of about 20–60° C., room temperature being particularly convenient and satisfactory. Lower temperatures may be used but are less desirable because of the slower reaction rates at such temperatures. Temperatures higher than about 60° C. are usually undesirable because they may cause degradation of the polymer. The reaction may be conducted at atmospheric, subatmospheric, or superatmospheric pressure. When the alkene is not normally gaseous, subatmospheric pressures sufficient to render it gaseous should be employed.

The time required for the reaction varies from about 30 minutes to several hours, depending on the temperature employed and the degree of alkylation desired. Ordinarily a desirable degree of alkylation is achieved in a relatively short time, e.g., about 1–2 hours.

The process is conducted in the substantial absence of catalyst poisons such as oxygen and carbon dioxide. Thus, before the catalyst components are added, air is evacuated from the reaction vessel. The air may be replaced by the gaseous alkene or, when it is desired to form the catalyst in the absence of the alkene, by an inert atmosphere such as nitrogen, helium, argon, etc. To facilitate temperature control it is usually desirable to conduct the reaction in an inert diluent, e.g., a liquid saturated cycloaliphatic hydrocarbon such as cyclohexane, etc. Since the alkylation is exothermic, large reaction batches may require cooling, such as by refrigerated reflux condensation.

When the desired degree of alkylation is attained, the reaction may be terminated by any conventional technique, e.g., by the addition of an excess of water, methanol, ethanol, or isopropanol. The products may then be recovered by any conventional technique.

The following examples are given to illustrate the invention and are not intended as a limitation thereof. Unless otherwise specified, quantities mentioned are quantities by weight.

EXAMPLE I

Prepare solution A by dissolving 60 parts of general purpose polystyrene in 400 parts of cyclohexane.

Prepare solution B by intimately mixing 0.084 part (1.83 molar proportions) of ethanol with a solution of 0.5 part (1.83 molar proportions) of molybdenum pentachloride in 35 parts of anhydrous benzene.

Prepare solution C by dissolving 0.93 part (7.32 molar proportions) of ethyl aluminum dichloride in hexane to form a 20% solution.

Charge a suitable reaction vessel with solution A, and substitute an ethylene atmosphere for the air in the reaction vessel. Add solution B with agitation and then solution C. Pressurize with 50 p.s.i. of ethylene. Before the pressure levels at 50 p.s.i., the polystyrene takes up 80 p.s.i. of ethylene, and the temperature rises to 38° C. before returning to room temperature. After stirring for one hour at room temperature while an additional of 8 p.s.i. of ethylene are taken up, add methanol to hydrolyze the catalyst. Isolate the reaction product by precipitation from a large excess of isopropanol.

The reaction results in the formation of 64 parts of alkylated polystyrene having a carbon content of 90.41% and a hydrogen content of 9.44%. Infrared analysis shows the presence of alkyl groups in the o-, m-, p-, and 3,5-positions.

EXAMPLE II

Repeat Example I except for purging the reaction vessel with nitrogen instead of ethylene and pressurizing with 20 p.s.i. of propylene instead of 50 p.s.i. of ethylene. The reaction results in the formation of 81 parts of alkylated polystyrene having a carbon content of 90.5% and a hydrogen content of 9.6% Infrared analysis shows the presence of alkyl groups in the o-, m-, p-, and 3,5-positions.

EXAMPLE III

Repeat Example I except for purging the reaction vessel with nitrogen instead of ethylene, removing the nitrogen, and then saturating the polystyrene solution with isobutylene instead of pressurizing with ethylene. The reaction results in the formation of 78 parts of alkylated polystyrene having a carbon content of 90.3% and a hydrogen content of 9.8%. Infrared analysis shows the presence of alkyl groups in the m- and p-positions.

Similar results are observed when the materials specified in the foregoing examples are replaced by materials taught in the specification to be equivalents thereof.

It is obvious that many variations may be made in the products and processes set forth above without departing from the spirit and scope of this invention.

What is claimed is:

1. An alkylation process which comprises contacting a polystyrene with an alkene and a catalyst composition consisting essentially of one molar proportion of a transition metal salt, about 0.5–15 molar proportions of an organometallic compound of a metal of Group I–A, II–A, II–B, or III–A of the Periodic Table, and about 1–6 molar proportions of a proton donor selected from glycols and compounds corresponding to the formula ROH wherein R is alkyl, aryl, alkaryl, or aralkyl and wherein any alkyl group contains up to 5 carbon atoms and any aryl group is phenyl or naphthyl.

2. The process of claim 1 wherein the polystyrene is a polystyrene having a Staudinger average molecular weight of about 40,000–100,000.

3. The process of claim 1 wherein the alkene contains 2–4 carbon atoms.

4. The process of claim 3 wherein the alkene is ethylene.

5. The process of claim 3 wherein the alkene is propylene.

6. The process of claim 3 wherein the alkene is isobutylene.

7. The process of claim 1 wherein the catalyst composition consists essentially of one molar proportion of the transition metal salt, about 0.75–5 molar proportions of the organometallic compound, and about 1–3 molar proportions of the proton donor.

8. The process of claim 7 wherein (1) the transition metal salt is a halide of tungsten, molybdenum, or rhenium, (2) the organometallic compound is an alkyl aluminum halide, and (3) the proton donor is an alkanol containing 1–5 carbon atoms.

9. The process of claim 8 wherein the transition metal salt is molybdenum pentachloride, the organometallic compound is ethyl aluminum dichloride, and the proton donor is ethanol.

10. The process of claim 9 wherein the catalyst composition consists essentially of one molar proportion of molybdenum pentachloride, about four molar proportions of ethyl aluminum dichloride, and about one molar proportion of ethanol.

References Cited
UNITED STATES PATENTS

| | | | |
|---|---|---|---|
| 2,661,335 | 12/1953 | Butler | 260—93.5 |
| 2,786,032 | 3/1957 | Hollyday et al. | 260—93.5 |
| 3,094,568 | 6/1963 | Hay et al. | 260—671 C |
| 3,666,825 | 5/1972 | Torck | 260—671 C |

JAMES A. SEIDLECK, Primary Examiner

U.S. Cl. X.R.

260—85.5 HC, 86.7, 88.1 PN, 88.2 S